United States Patent [19]

Cattrall et al.

[11] Patent Number: 4,839,816

[45] Date of Patent: Jun. 13, 1989

[54] LUMBER CUTTING SYSTEM

[76] Inventors: Thomas J. Cattrall, 7600 Seawood Rd., SE., Amity, Oreg. 97101; Richard E. Lord, 1240 Calapooia St., Albany, Oreg. 97321

[21] Appl. No.: 56,957

[22] Filed: Jun. 2, 1987

[51] Int. Cl.$^4$ ............................................. B27B 1/00
[52] U.S. Cl. ................................. 364/474.09; 83/367
[58] Field of Search ................. 364/475, 564, 474.09; 83/364, 367; 144/357, 378

[56] References Cited

U.S. PATENT DOCUMENTS

| | | | |
|---|---|---|---|
| 3,931,501 | 1/1976 | Barr et al. | 364/475 |
| 3,992,614 | 11/1976 | Buss | 364/475 |
| 4,221,974 | 9/1980 | Mueller et al. | 364/475 |
| 4,462,443 | 7/1984 | Allen | 83/367 |
| 4,468,992 | 9/1984 | McGreehee | 83/57 |
| 4,524,858 | 6/1985 | Maxey | 83/367 |
| 4,546,440 | 10/1985 | Palmberg | 364/475 |
| 4,596,172 | 6/1986 | Visser | 83/71 |
| 4,702,134 | 10/1987 | Corley, III | 364/475 |

Primary Examiner—Allen MacDonald
Attorney, Agent, or Firm—Robert L. Harrington

[57] ABSTRACT

A system for maximizing the board width fitting to a flitch wherein grade lumber rules permit a designated percentage of wane area. The side edges of the minor face of the flitch are assumed to be straight edge line segments. Each line edge segment is established at designated vertical distances. The beginning and end of each line edge segment is thus determined and the relative longitudinal and lateral positions as between the beginning and end of each line segment determines a rectangular area that is assumed to be half surface area and half wane area. The side edge of a board is then computed to include the allowable wane area. Boards may also be force fit from visual examination by designation of the board width that will separate the flawed portion from the non flawed portion.

8 Claims, 4 Drawing Sheets

LUMBER CUTTING SYSTEM

FIELD OF INVENTION

This invention relates to a system for maximizing lumber production wherein area wane is a consideration of acceptability.

BACKGROUND OF THE INVENTION

Scanners to examine logs, center cants, and flitches, and computers to analyze the data from the scanners and determine the optimum cutting pattern, have been in use in saw mills for many years. A scanner and computer system first determines the lumber that can be produced from a log, and from that information, the optimum cutting of the log into a center cant and flitches (the slices of wood from each side of the center cant having a determined thickness but meandering width). The center cant is directed to one operation to be analyzed and cut into dimensional lumber of one type, and the flitches are directed to another operation to be analyzed and cut into dimensional lumber of varying types.

With respect to this secondary operation of analyzing and cutting the flitches, the flitches have a specific, determined thickness but have a non-determined and inconsistent width. The side edges that define the width are a result of the original configuration of the log. Because the flitches are simply untrimmed slices from the log, the side edges are sections of the log's periphery. Because the slices are taken off center (to one side or the other of the center cant), the edges are angled relative to the side faces and one face is slightly smaller in area that the other. These angled edges are not straight (they meander) and they are not parallel to each other, (they tend to diverge) a result of the conical configuration of a log. (Hereafter these edges will be referred to as wane edges.)

It is well-known that very small gains in log utilization make substantial differences in saw mill economy. Thus an important aspect of the scanning and computer systems as applied to flitches is to fit the maximum number of pieces (of highest value) into the available surface area of a flitch. In many instances, a lumber piece will not quite fit the smaller of the two faces but will the larger; i.e., in the smaller face the side edge of the proposed piece extends over the angled wane edge. However, the rules applied to acceptability for dimensional lumber permit a limited amount of this wane edge to be embodied in a finished lumber piece. The lumber piece that extends over the wane edge has to be an exact full width in profile whereby the side edges of the lumber piece are complete lengthwise along the entire length of that piece. That is, the corner where the smaller face and side edge meet can be somewhat "rounded" but at least a portion of the side edge must extend along the entire length of the piece in a straight line. Obviously if the lumber piece is fit totally to the larger face, the edge will be complete along that face.

Whereas scanning and computer technology has been developed to accommodate the problem of fitting the maximum number of specifically dimensioned lumber pieces to a flitch, a different problem arises when the flitches are to be cut into grade lumber; e.g., lumber to be used for door frames, trim, furniture, and the like. That is because the rules for acceptability are different. Whereas a width will be designated, the width can typically vary plus or minus 0.5 inch. That is, they have random widths and are sold, e.g. as a 6-inch wide board even though the the board may be a true width of anywhere between 5.5-inches and 6.5-inches. etc.

Furthermore, grade lumber will be graded depending on the "flaws" visually apparent in the wood; e.g., knots, splits, nicks, etc. (A flaw is any visual abnormality determined undesirable for that particular grade of lumber.) Within a given flitch it may be desirable to cut certain widths out of the board for high-grade, the remaining widths having the flaws) being designated of lower-grade. Whereas the scanning systems are not capable of detecting these visual flaws, an operator will identify the flawed areas and designate sections of higher or lower grade lumber. This designation forces into the system a saw line that must then be accommodated by the system. (Referred to as a "forced-board" fitting.)

Finally, there is area wane. For grade lumber, area wane is the area of the face of a proposed board (the smaller face) that does not fill out the precise rectangular area of designated width and length. (This is not be confused with wane edge, but as will be explained, the existence of wane edge is encompassed as a part of area wane.) Contrary to the rules for dimensional lumber, the profile of grade lumber does not have to be a complete rectangle; i.e., edge portions can have voids. Whether there is a void or simply a wane edge, whatever is missing from the rectangular surface area is area wane and must be calculated as a percentage of the designated dimensional area. The rules for grade lumber designate the acceptable percentage of area wane for different grades.

BRIEF DESCRIPTION OF THE INVENTION

To accomplish a fitting of grade lumber pieces to a flitch in a manner that maximizes the lumber value under the rules of grade lumber, a new system was developed. Because the lumber pieces are random width, the edges of the board to be fit can be moved in and out relative to the edge of the flitch to whatever width is otherwise required to meet the rules. The scanner and computer are then utilized to plot the edge line at each side of the flitch (again at the smaller face). Data points are located at, e.g. 3-inch intervals along the length of the edge line. Line segments are "drawn" between every two points, representing the edge line. Vertical and horizontal lines through the points generate triangles with the vertical distance being the 3-inch interval and the horizontal distance being the horizontal distances between two adjacent points. Each vertical line is assumed to be a prospective board edge, and the area wane can be calculated by adding triangles and rectangles established inward of the prospective edge line. This process will determine the two adjacent prospective lines on either side of the desired line, i.e., the line that establishes the rectangular area having the precise acceptable percentage of wane area. The desired line is then calculated, e.g. by interpolation.

The invention will be more clearly understood by reference to the detailed description and drawings wherein.

Figure 1:
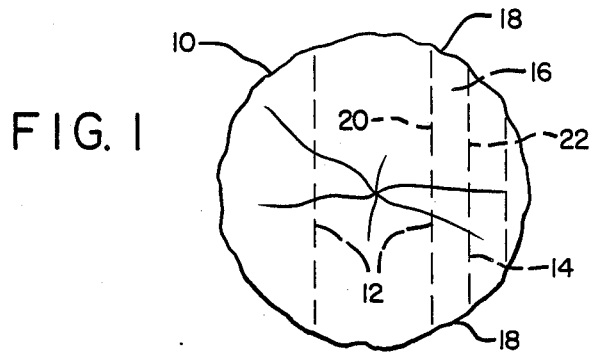
FIG. 1 illustrates the primary breakdown of a log.

Referring to FIG. 1 of the drawings, a log 10 is shown in end view with dotted lines indicating a typical breakdown of a log into a center cant (between lines 12) and side flitches. A dotted line 14 illustrates a vertical slice from the log which is to become a flitch 16. As shown, the wane edges 18 of the flitch 16 are dictated by the configuration of the log's periphery. As will be obvious from FIG. 1, the inner surface or face 20 is broader than the outer face 22. Hereafter the inner face is sometimes referred to as the major face or surface and the outer face is referred to as the minor face or surface.

Figure 2:
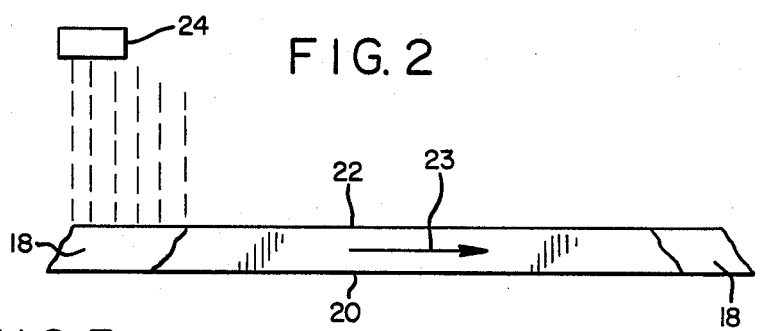
FIG. 2 is an end view of a flitch from the log of FIG. 1, but in a secondary operation.
Figure 3:
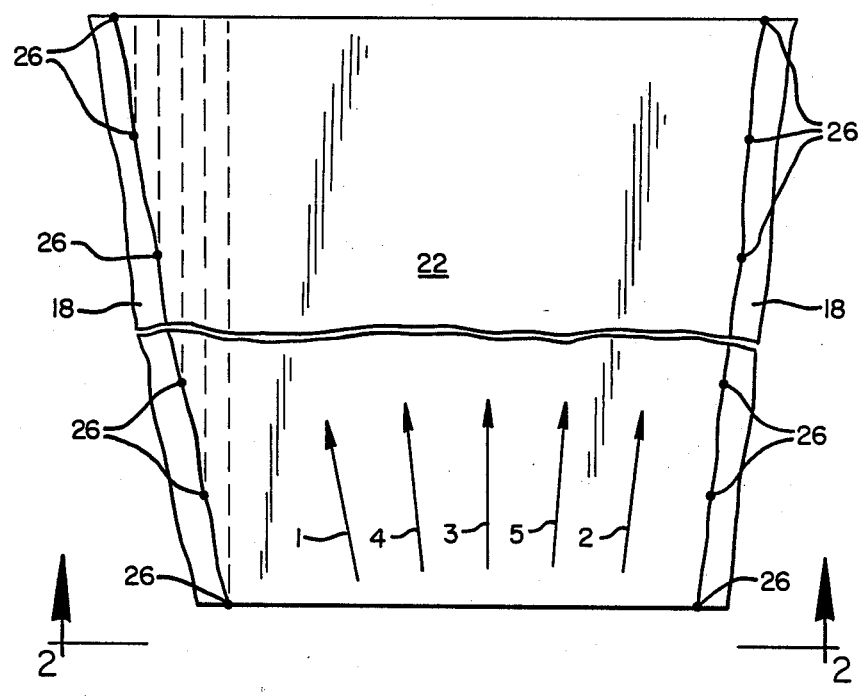
FIG. 3 is a plan view of the flitch with points and lines indicating information generated by the scanner of FIG. 2.
Figure 4:
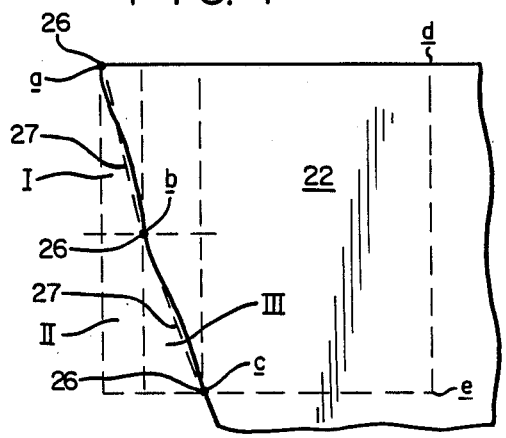
FIG. 4 is an enlarged partial view of a corner of the flitch of FIG. 2.

Referring now fo FIGS. 2 through 4, the flitch 16 is shown laid on its major face 20. Whereas logs are typically conical in shape, a longitudinal slice from the log (flitch 16) will often generate a trapezoidal configuration as illustrated in FIG. 3. FIG. 2 is a view from the small end of the flitch (see view lines 2—2 of FIG. 3). Note however that logs have a variety of shapes and this invention is applicable to flitches taken from any log shape.

FIG. 2 illustrates the flitch being conveyed (arrow 23) under a scanner array housed in housing 24 that scans across the width of the flitch to detect the presence or non presence of surface 22. It will be understood that the scanner scans across the log at incremental positions down the length of the log (as if there were numerous scanning stations located across the path of the log at e.g. 3 inch intervals). An example of the scanning procedure is to obtain data points at three inch increments down the length of the log (although scanners are capable of scanning much more closely spaced positions) with readings taken for every 0.1 inch movement of the flitch.

The above description of the scanning process and the information generated is typical for flitch scanning in dimensional lumber processes. However, the utilization of the information for satisfying grade lumber rules is different and will now be explained.

First, wane edge positions are determined at points 26, e.g. 3-inch increments along the flitch length. These positions are determined as points on the line of intersection between the surface 22 and the wane edge 18. For purposes of determining area wane, the existence or non-existence of the wane edge outside this line is immaterial. It is assumed to be simply area that is missing from the face 22.

Also assumed is that the line of intersection is a straight line as between any two points 26 (e.g., dash lines 27 between points a and b and points b and c of FIG. 4). FIG. 4 outlines a small segment a,b,c,d,e of face 22. This segment is viewed as a flitch for the purpose of explaining, in a more simplified manner, the process steps of the invention. The first task is to determine the area of sections I, II, and III. The vertical height as between positions a and b is known to be 3 inches. The horizontal distance between positions a and b is readily provided from the scan data. The area I (from simple geometry) is 0.5 times 3-inches times the horizontal distance between a and b. Area II is 3-inches times the horizontal distance between a and b. Area III is 0.5 times 3-inches times the horizontal distance between positions b and c. Using this information, the task is to then find the left side edge of a desired board for a flitch surface represented by the points a,b,c,d,e wherein the wane area percentage to the entire board is established by the wane area rule.

The solution is calculated as the percentage of area wane for a rectangular surface area represented by the included horizontal distance (h.) and the included vertical distance (v.). For the full rectangular area represented by ad(h.) and de(v.) divide the cumulative areas I, II, and III by the area ad(h.) times de(v.). If the wane area percentage is found to exceed the wane area rules, next calculate for the rectangular area represented by bd(h.) and de(v.). Thus the percentage of area III is divided by the area bd(h.) times de(v.). If that wane area percentage is too low, next determine the wane area percentage for the desired point between ab. One solution is to determine the wane area for a mid-point, i.e., area III plus $\frac{1}{2}$ area II plus $\frac{1}{4}$ area I, divided by bd(h.) times be(v.) plus $\frac{1}{2}$ ab(h.) times de(v.). If not satisfactory a second mid-point (half of the half) is considered, and the process is continued until the wane area percentage (give or take some establlished tolerance) matches the wane area percentage rule. An alternative to the iterative process described is to assume a fixed permitted wane area as calculated at the shorter point 26 (point b) and develop a formula that will move the edge outwardly of point b to an exact position that provides the fixed permitted wane area.

The above calculations are simplified as there wil be many areas I, II, III, ... etc., to contend with. Also, whereas the illustration shows the wane edge continuously angled inwardly, it may be concavely bowed to further complicate the calculation. However, such complications are well within the expertise of a competent programmer once he establishes the straight line segments and adopts the triangulation method of computing area.

Figure 8:
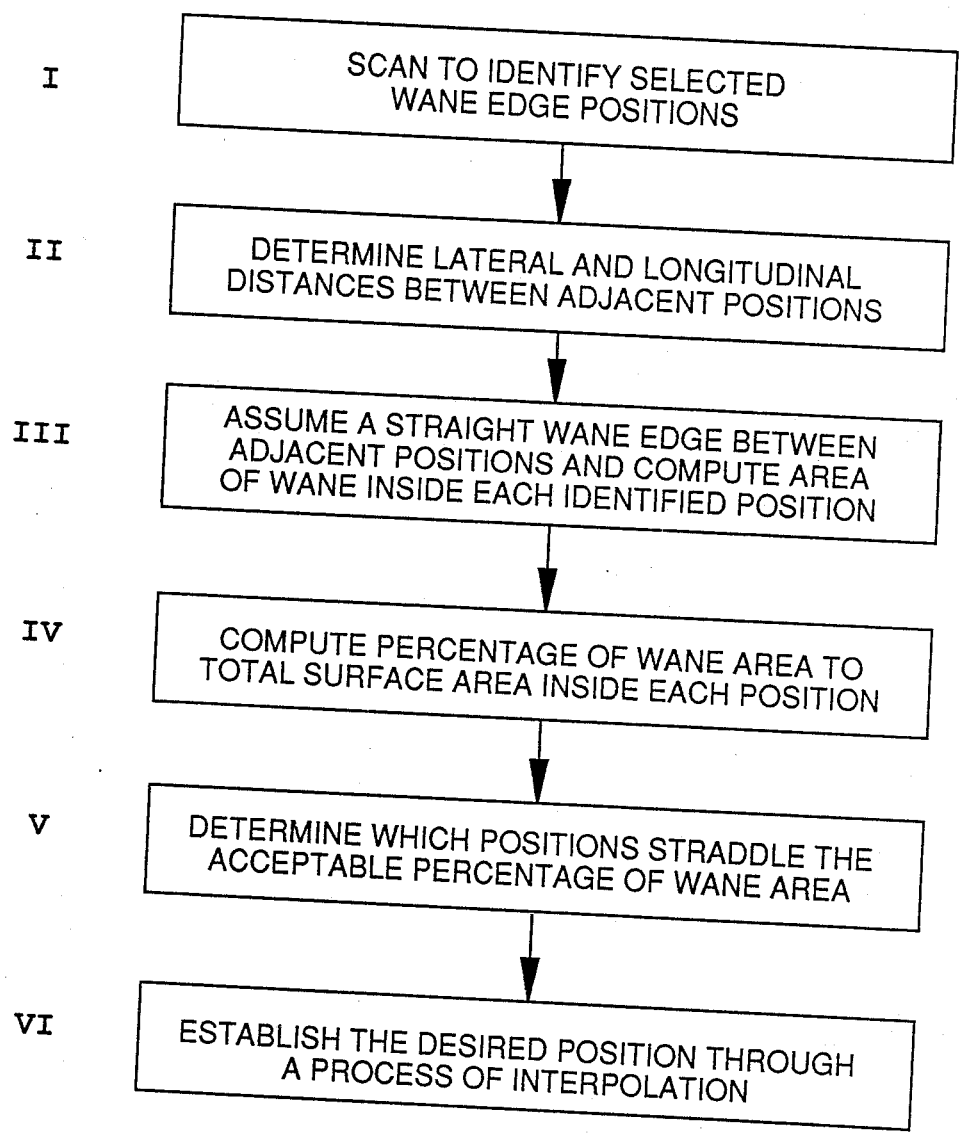

The steps of the process are generally illustrated in the flow chart of FIG. 8.

Step I is to scan the surface of the flitch and identify the XY coordinates of the selected incremental positions along the wane edge.

Step II is the determination of the lateral and longitudinal distances, it being understood that the longitudinal distances are determined by the selected increments whereat scan data is taken.

Step III is the computation of the total wane area inside each position (on the side of the face 22) assuming a longitudinal cut at that position. This, of course, is accomplished by the process illustrated in FIG. 4 and explained in the preceding section.

Step IV is the computation of the wane area percentage as compared to the total surface area inside the selected position.

Step V is to compare the acceptable wane area percentage to the computed percentages of the selected positions and thereby identify which of these positions is the closest but smaller than and larger than the acceptable percentage.

Step VI is the process of identifying an intermediate position that generates a wane area percentage that closely approximates the acceptable percentage through any of various processes that can be referred to as interpolation. Two such processes are described above.

A still further complication is the need to include the area wane of the opposite side. Where the full width is to be considered in the calculation, the programmer will want to program computations to consider the two edges simultaneously. The first outward step into the wane edge produces the smallest wane area. That is, with reference to FIG. 3, note that the movement outwardly of the proposed cut line from the innermost point 26 at the left edge, to the adjacent point 26, produces a small area of wane. The next step doesn't just double the wane area, but essentially quadruples it. Each successive step adds increasingly greater areas of wane. For purposes of explanation, the first outward step may encompass an area wane that calculates to 1% of the total area. The next step which adds the equivilent overall area, produces a wane area that adds about 3% for a total of 4% wane area. The next step may add 6% for a total of 10% etc. Thus if the first step moves outwardly to a second point 26 at both side edges, the same width is added (essentially) as the first two steps described above for only the left edge, but with a 2% area wane as compared to the 4%. It will be appreciated that a wider board will result by moving outwardly at both side edges (e.g. if a 3% wane edge were permitted, the two step outward movement at the left edge would not be permitted because it would add 4% wane area, while the simultaneous movement of both edges would because it totals merely 2% wane area). Thus the widest board from the flitch will generally be that width that is centered between the two side edges.

A difference from dimensional lumber is the grade rule that permits board widths to vary plus or minus from the designated width (e.g. a designated 8-inch board can be from 7.5 inches to just under 8.5, inches a 9 inch board from 8.5 inches to just under 9.5 inches etc.). Thus the maximum board width can be fit to the flitch regardless of the designated width. In some cases, the actual width will be less than the designated width and the mill will benefit, and in other cases the customer will benefit.

Whereas a different maximum width may be generated at different angular fittings of the board to the flitch, the computer program will desirably be repeated at different angular settings. A suggestion of different angular settings is (1) an angle that aligns the board up the left side edge, (2) an angle, that aligns the board to the right side edge, (3) an angle that is the center position between the side edges, and (4) and (5) a mid-point position between the center position and each of the side edges (see arrows 1 through 5 in FIG. 3). The illustrated computations were for an angular setting at the center position 3.

Figure 7:
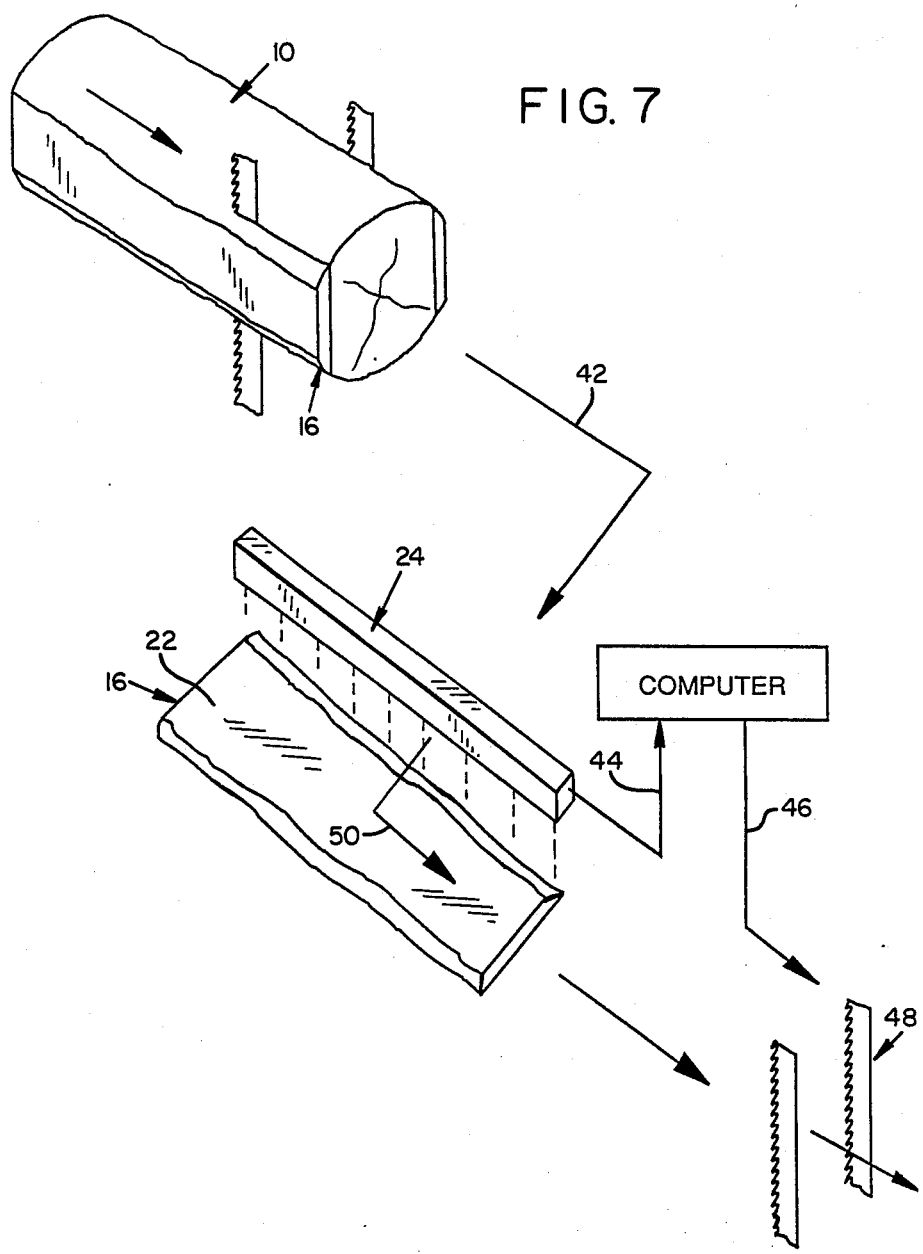
FIGS. 7 and 8 are simple flow diagrams illustrating the process of the invention.

The specific steps as described above are more generally illustrated in the flow diagram of FIG. 7. As previously described, flitches 16 are sawn from a log 10. The flitches are oriented for scanning of the minor face 22 and then passed laterally through a scanner array 24 (See directional arrow 42). The data from the scanner is transmitted to a computer (arrow 44) and the computer instructs (arrow 46) the setting of saws 48. The flitch 16 is then directed through the saws as indicated by arrows 50.

FORCED BOARD CONSIDERATION

Figure 5:
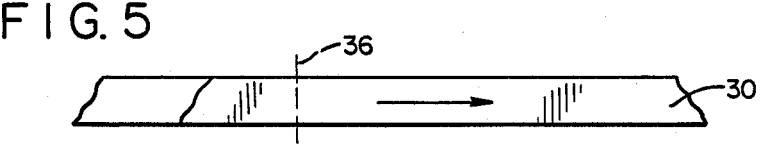
FIG. 5 illustrates a second flitch being scanned to demonstrate the forced board handling of a flitch.
Figure 6:
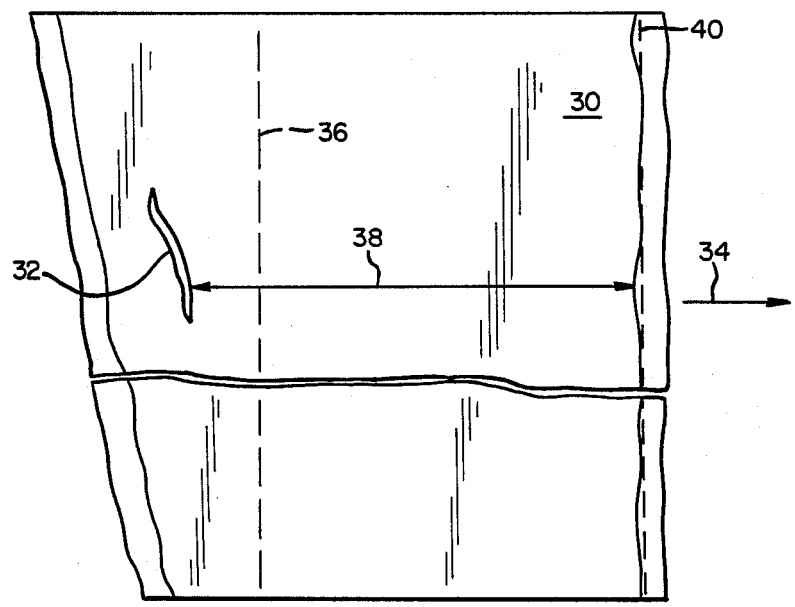
FIG. 6 is a plan view of the flitch of FIG. 5.

FIGS. 5 and 6 illustrate the inventive concept applied to a condition of "forced board" fit. As a flitch is being conveyed to the scanning station, an operator will observe the flitch. A defect in the flitch will prompt the operator to initiate a forced board fitting into the system. (Note that a defect, as the term is used herein, encompasses any grade differentation. For example, a flitch of straight grain may be interrupted by an area or section that doesn't qualify as straight grain quality. Such an area may be referred to as a defect.) This is simply the application of personal judgment, a requirement because of the inability of existing scanning systems to detect many of the defects affecting grade.

FIG. 6 illustrates a flitch 30 having a defect 32; e.g. in the form of a split in the wood. Arrow 34 indicates the direction of movement of the flitch through a scanning station. In the illustration of FIGS. 5 and 6, the leading edge of the flitch is shown as being generally perpendicular to the path of movement. However, it will be understood that the scanner and computer analyze the flitch at whatever orientation is programmed and a selected angular orientation relative to the scanner is not required. It is shown oriented only for convenience of illustration and explanation.

The forced board fitting is a procedure whereby the operator attempts to capture the defect in a minimal area of the flitch. By strategic designation of board widths, leading and/or following the defect, the value of that flitch can be greatly increased. The object is to separate different grade quality. The process accordingly includes the reverse, i.e. where the forced board designation encompasses the defect with the nondesignated portion being the preferred higher quality piece.

In the situation of FIG. 6, the defect 32 is shown near the trailing edge. Thus the operator will likely designate only a leading board width (as the preferred higher quality) or he may designate the trailing edge (as the non-preferred lower quality). This designation is established as a conservative estimate of the distance between the leading edge and the defect and accuracy is largely dependent on the operator's skill. For example; he may estimate that the defect is about twelve inches back of the flitch's leading edge, e.g. distance 38. He may then conservatively designate a forced board of 10 inches from the board's leading edge, He will also designate the grade which in turn establishes the permitted percentage of area wane. The computer will then establish the cut lines 36 and 40 calculating a 10 inch width board that overlaps the leading edge of the surface to produce the allowed wane area percentage, i.e. to produce cutting line 40. The distance between lines 40 and 36 is of course 10 inches.

The solution for a forced board fit is somewhat more simple that the full board width solution of FIGS. 1-4. That is because the total board width is fixed; i.e., it is forced. Also, the angular orientation may be a consideration of the operator in determining the forced board configuration and in such instances he will also designate the angular orientation.

In that the percentage of area wane is established by the grade rule and in that the board area is largely known (there may be some variation in length however) the actual wane area to be included is largely known at the outset. The cutting line 36 is thus established by first finding the leading edge 40 by the procedure previously described and which includes the acceptable wane area. Line 36 is then established ten inches from line 40. The remainder of the board is calculated in a manner similar to FIGS. 1-4 except the leading edge will be straight. This "remainder" board will include the defect and it can either be cut out in a subsequent manual operation, or the board will simply be downgraded as made necessary by the defect.

It will be appreciated that the defect may reside in the center of the flitch. The operator in such a case can designate both leading and trailing forced board fittings. Again the process is similar to that described. The orientation of the board will likely be forced to the center-angular position and the center strip containing the defect will then be down-graded or re-cut into shorter defect-free boards.

As explained, the inventive concept herein resides in the provision of a system provided for wane edge analysis with conventional scanning and computing capabilities. The meandering edge of the surface is converted to a sequence of small triangular sections susceptable to geometric computation. This concept is believed unique to the operation of lumber production with particular application to grade lumber production from flitches.

However, the invention is not limited to a specific board type and the term flitches as used herein is intended to apply broadly to log sections produced from sawn logs and having edge wane. One can readily see that the center cant of FIG. 1 (between lines 12) will qualify as a flitch. It can be rotated ninety degrees after the initial flitches 16 have been removed and vertical cuts made through the rotated center cant will produce further flitches. These further flitches may also have application to grade lumber production. Furthermore, applying the invention to the center cant prior to sawing off the "further flitches" can help determine the optimum cutting lines to be made through the center cant. The invention encompasses modifications, improvements, and variations to the above preferred embodiment as will be determined by reference to the claims appended hereto.

We claim:

1. A method for optimizing the board configuration from a flitch wherein specified rules determine the percentage of wane area permitted for the board, which comprises;

scanning a flitch to generate data determining the profile of the leading and trailing side edge lines of the minor face of the flitch and the relationship of one side edge line to the other, entering the data into a computer, determining the coordinates of each edge line at designated increments along the longitudinal length of the flitch, as between each adjacent set of coordinates along an edge line, determining the lateral and longitudinal dimensions and treating the included rectangles defined by the lateral and longitudinal dimensions as consisting of equal triangles, one representing surface area and the other representing wane area, computing the lateral position of a longitudinal straight line as a selected board edge line that includes determining the percentage of wane area determined from the accumulated included rectangles relative to the total proposed designated area that satisfies a designated wane area percentage rule.

2. A method as defined in claim 1 which includes, determining a lateral position of the selected board edge line as falling in a range between the lateral positions of two adjacent sets of coordinates, determining the allowable wane area for the smaller of the two rectangular areas determined by the two sets of coordinates, and computing the additional board width permitted by the determined allowable wane area.

3. A method as defined in claim 2 which includes establishing both side edge lines of the flitch and cooperatively fitting the board edges to the two side edge lines of the flitch to maximize the lateral dimension of the board.

4. A method as defined in claim 3 which includes computing the fit of the board to the flitch at multiple selected angular settings including at least one setting aligned with each side edge of the flitch and a mid-position therebetween.

5. A method for optimizing the board configuration from a flitch wherein specified rules determine the percentage of wane area allowable for the board, which comprises;

examining a flitch to determine the presence of flaws that affect grading of the board, designating a board width to be fit to a specified side of the flitch that excludes the flaws that have been determined, computing in a computer the allowable wane area for the designated board width and establishing the position of one board edge at the specified side of the flitch to encompass the allowable wane area.

6. A method as defined in claim 5 which includes designating the board width and angular setting of the boards to the flitch based on visual examination.

7. A method as defined in claim 6 which includes isolating the flawed portion of the flitch by designating board widths as permitted from both side of the flitch.

8. A method as defined in claim 5 which includes computing the fit of the board to the flitch at multiple selected angular settings including at least one setting aligned with each side edge of the flitch and a mid-portion therebetween.

* * * * *